(12) United States Patent
Lai et al.

(10) Patent No.: US 9,783,687 B2
(45) Date of Patent: Oct. 10, 2017

(54) NON-HALOGEN FLAME RETARDANT AS COATINGS FOR FIBROUS FILTER MEDIA

(71) Applicant: Lubrizol Advanced Materials, Inc., Cleveland, OH (US)

(72) Inventors: John Ta-Yuan Lai, Broadview Heights, OH (US); Ti Chou, Bay Village, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 15/063,698

(22) Filed: Mar. 8, 2016

(65) Prior Publication Data

US 2016/0185982 A1    Jun. 30, 2016

Related U.S. Application Data

(62) Division of application No. 14/354,769, filed as application No. PCT/US2012/062642 on Oct. 31, 2012, now abandoned.

(60) Provisional application No. 61/553,468, filed on Oct. 31, 2011.

(51) Int. Cl.
| | |
|---|---|
| C09D 5/18 | (2006.01) |
| C08F 230/02 | (2006.01) |
| C09D 143/02 | (2006.01) |
| C09D 7/12 | (2006.01) |
| B01D 29/00 | (2006.01) |
| B01D 39/16 | (2006.01) |
| B01D 46/00 | (2006.01) |
| C09D 161/06 | (2006.01) |
| C09D 161/24 | (2006.01) |
| C09D 175/04 | (2006.01) |
| C08F 8/30 | (2006.01) |
| C08K 5/3492 | (2006.01) |

(52) U.S. Cl.
CPC ............ *C09D 5/18* (2013.01); *B01D 29/0093* (2013.01); *B01D 39/1607* (2013.01); *B01D 46/0001* (2013.01); *B01D 46/0093* (2013.01); *C08F 8/30* (2013.01); *C08F 230/02* (2013.01); *C09D 7/1233* (2013.01); *C09D 143/02* (2013.01); *C09D 161/06* (2013.01); *C09D 161/24* (2013.01); *C09D 175/04* (2013.01); *C08K 5/34924* (2013.01); *Y10T 428/31935* (2015.04)

(58) Field of Classification Search
CPC ........ C08F 8/30; C08F 220/56; C08F 230/02; B01D 29/0093; B01D 39/1607; B01D 46/0001; B01D 46/0093; C09D 143/02; C09D 161/06; C09D 161/24; C09D 175/04; C09D 5/18; C09D 7/1233; Y10T 428/31935

See application file for complete search history.

(56) References Cited

U.S. PATENT DOCUMENTS

| | | | |
|---|---|---|---|
| 3,883,463 A | 5/1975 | Jin et al. | |
| 3,969,440 A | 7/1976 | Edelson et al. | |
| 4,248,929 A | 2/1981 | Morgan et al. | |
| 5,191,029 A | 3/1993 | DelDonno | |
| 5,281,239 A | 1/1994 | Chatelin et al. | |
| 6,218,456 B1 | 4/2001 | Schlarb et al. | |
| 6,336,948 B1 | 1/2002 | Inoue et al. | |
| 7,829,629 B2 | 11/2010 | Ahn et al. | |
| 7,919,556 B2 | 4/2011 | Koziski et al. | |
| 7,999,014 B2 | 8/2011 | Mineo et al. | |
| 2003/0114617 A1 | 6/2003 | Yukawa et al. | |
| 2006/0101796 A1* | 5/2006 | Kern | B01D 39/2024 55/524 |
| 2006/0231487 A1* | 10/2006 | Bartley | B01D 39/18 210/506 |
| 2007/0192966 A1* | 8/2007 | Cottrell | C08F 230/02 8/115.51 |
| 2009/0212268 A1* | 8/2009 | Fukuzumi | C08K 9/06 252/609 |
| 2010/0261862 A1 | 10/2010 | Sugiyama et al. | |
| 2014/0296396 A1 | 10/2014 | Lai et al. | |

FOREIGN PATENT DOCUMENTS

| | | | |
|---|---|---|---|
| CN | 102071032 | 5/2011 | |
| DE | 29601847 U1 * | 3/1997 | ............ B01D 39/00 |
| EP | 1820895 | 8/2007 | |
| EP | 2194185 | 6/2010 | |
| JP | 2007182652 | 7/2007 | |
| KR | 2010126612 | 12/2010 | |
| WO | 2006/055377 | 5/2006 | |

(Continued)

OTHER PUBLICATIONS https://en.wikipedia.org/w/index.php?title=Melamine_cyanurate&oldid=241472079, 2008.*

(Continued)

*Primary Examiner* — Satya Sastri
(74) *Attorney, Agent, or Firm* — Christopher P. Demas; Teresan W. Gilbert

(57) ABSTRACT

Non-halogenated monomers that can be polymerized into flame retardant polymers, and processes to produce the monomers and polymers is provided. In a simplest aspect, there is provided a monomer composition that can comprise a) a group derived from one of a (meth)acrylic acid, (meth)acrylamide, or vinylbenzene, b) a polyphosphate moiety, and c) an amine species. In the monomer composition, the ethylenically unsaturated monomer of (a) is covalently bonded directly or through a linking group to the moiety of b), forming a precursor monomer unit. The amine species of c) is in complex with the precursor monomer unit. The polymer can be a homopolymer of the monomer composition, or a copolymer of the monomer composition having varying a), b) and c). In one embodiment, the polymer can additionally comprise ethylenically unsaturated monomers not covalently bonded to a polyphosphate moiety.

15 Claims, No Drawings

(56) References Cited

FOREIGN PATENT DOCUMENTS

| WO | 2006/113266 | 10/2006 |
|----|-------------|---------|
| WO | 2007006648  | 1/2007  |
| WO | 2007/120341 | 10/2007 |
| WO | 2010/113796 | 10/2010 |
| WO | 2011/139580 | 11/2011 |

OTHER PUBLICATIONS

DE 29601847 U1, Mar. 1997, Derwent Ab.*
https://nissanchem-usa.com/products/melamine-cyanurate/, dated 2007.

* cited by examiner

NON-HALOGEN FLAME RETARDANT AS COATINGS FOR FIBROUS FILTER MEDIA

BACKGROUND OF THE INVENTION

The disclosed technology relates to non-halogen flame retardant compositions comprising phosphorus in complex with nitrogen.

Halogens, i.e., fluorine, chloride, bromine and iodine, can be used in fire retardant compositions. However, halogens are very active chemical elements and can generate toxic substances, such as dioxin and difuran, upon degradation. These substances can accumulate in a human body for long periods of time and cause environmental hormone problems. In addition, fluorine, chloride and bromine in particular, have been known to cause severe depletion of ozone. For this reason, the use of halogens, whether as flame retardants or in other applications, is increasingly regulated. Accordingly, there is a need for non-halogenated flame retardants.

In addition, there is a need for flame retardant compositions for fibrous filter media. In some filtrate systems, hot particles can be carried with the filtrate and onto the filter. These hot particles can cause minor burn damage, such as pinholes, or in some cases lead to ignition of the filter resulting in fire. Many current flame retardant filter coatings present problems. For example, some coatings may be halogenated, some can chemically wear the filter media material, some interfere with the filter porosity, and some wash off and leave the filter vulnerable.

There is a need for non-halogenated flame retardant compositions that address some of these issues.

One method of obtaining a flame retardant composition is to include phosphorus in the composition. For example, U.S. Pat. No. 5,281,239 to Chatelin et al., issued Jan. 25, 1994, teaches a method of grafting a fibrous material with phosphoric acid ethylenic esters of the general formula:

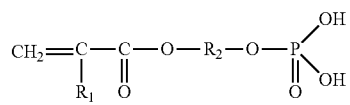

the graft rate of the ester is taught to be less than or equal to 20%.

Similarly, U.S. Publication No. 2010/0261862 to Sugiyama et al., published Oct. 14, 2010, teaches a method for grafting phosphorus containing compounds along with an amine compound onto a cellulosic fiber. The method relies on irradiating the fiber to create radicals to which the phosphorus containing compound may bind.

JP2007182652A to Toshio, published Jul. 19, 2007, teaches flame retardant additives comprising a mixture of an organic phosphorus-base-flame-retarder and a nitrogen type flame retardant. Similarly, CN 102071032 teaches the use in combination of phosphorus containing and nitrogen containing flame retardants. These publications only teach compounds containing tribasic phosphoric acid and do not teach polymerizing the compounds.

Polymer compositions containing a rubber modified vinyl resin, a polyphenylene ether resin, a cyclic alkyl phosphate compound, and an aromatic phosphate ester are taught in U.S. Pat. No. 7,829,629 to Ahn et al., issued Nov. 9, 2010. Similarly, U.S. Publication No. 2007/0192966 to Cottrell et al., published Aug. 23, 2007, teaches flame retardant phosphorus containing polymers comprised of between 10 and 100 wt. % of phosphorus containing monomer derived units. Neither of the aforementioned references teaches a polymer in which the monomers are in complex with an amine species. These polymers would be highly acidic and damaging to various substrates and thus, a transport concern.

SUMMARY OF THE INVENTION

The inventors have discovered novel flame retardant (FR) monomers that can be polymerized into novel non-halogenated flame retardant polymers that maintain flame retardance and tensile properties when used in coatings compositions for fibrous filter media.

Thus, in one embodiment, the invention provides a coating composition for filter media. The coating composition comprises a flame retardant polymer comprised of monomeric units derived from a flame retardant monomer composition. The flame retardant monomer composition is comprised of a) a group derived from one of a (meth)acrylic acid, (meth)acrylamide, or vinylbenzene, b) a polyphosphate moiety, and c) an amine species. The ethylenically unsaturated monomer of a) is covalently bonded directly or through a linking group to the polyphosphate moiety of b) forming a precursor monomer unit. The amine species of c) is in complex with the covalently bonded polyphosphate moiety of b) in the precursor monomer unit.

In some embodiments, at least 20% of the monomers in the polymer of the coating composition for filter media are the flame retardant monomer compositions and from 0.1% to about 80% of the monomers in the polymer are ethylenically unsaturated monomers that are not covalently bonded to a polyphosphate moiety. In addition, the polymer can be comprised of at least 1 wt. % phosphorus and have a Mn of at least about 1000 g/mole. Further, at least 90% of the monomers in the polymer can comprise a combination of ethylenically unsaturated monomers that are not covalently bonded to a polyphosphate moiety and the flame retardant monomer compositions.

In further embodiments, the coating composition for filter media can further comprise from about 1 to about 50 parts by weight of a flame retardant additive, such as, for example, melamine cyanurate, per 100 parts by weight of said flame retardant polymer.

In another embodiment, the coating composition for filter media can be additionally blended with one or more polyurethane polymers, polyamide polymers, polyurea polymers, polyacrylate polymers or mixtures thereof.

In a further embodiment, the invention provides a filter comprised of a fibrous filter media and a flame retardant coating composition for filter media as described herein.

DETAILED DESCRIPTION OF THE INVENTION

Various preferred features and embodiments will be described below by way of non-limiting illustration.

All ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "wt. %" means the number of parts by weight of ingredient per 100 parts by weight of the composition or material of which the ingredient forms a part.

As used herein, a polyphosphate moiety refers specifically to a group containing a phosphorus atom bonded to three oxygen ions (phosphonate) or a phosphorus atom bonded to four oxygen ions (phosphate). The polyphosphate moiety may contain mono-, di-, tri-, or higher phosphate, or a mono-, and/or di-phosphonate, and in particular a mono-phosphate, diphosphate, triphosphate or monophosphonate. Preferrably the polyphosphate moiety is a mono-, di-, or tri-phosphate.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:
  (i) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);
  (ii) substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);
  (iii) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. As used herein, an alkyl group containing an oxygen atom is refered to as an alkoxyl group.

The term "coating" is used herein to refer to impregnation, saturation, roller, brush, spray, foam and curtain coating and similar procedures.

The expression "( )," such as "(meth)", "(alk)", or "(alkyl)," is used to indicate that the particular substituent in a chemical name is optionally present but may be absent. For example, the term "(meth)acrylate" may be used to refer to either acrylate or methacrylate.

As used herein the term "polymer" refers to the product of a polymerization reaction in which the molecules of one or more monomers are linked together to form large molecules whose molecular weight is a multiple of that of the one or more monomers. These polymers may be homopolymers or copolymers. These polymers may be linear polymers, branched polymers, cross-linked polymers, or a mixture of two or more thereof.

The term "homopolymer" is used herein to refer to a polymer resulting from the polymerization of a single monomer.

The term "copolymer" is used herein to refer to a polymer resulting from the polymerization of two or more chemically distinct monomers.

The term "linear polymer" refers to a polymer in which the molecules form long chains without branches or cross-linked structures.

The term "branched polymer" refers to a polymer in which the molecules form a main chain or polymer backbone and one or more additional relatively short chains are attached to the main chain or polymer backbone.

The term "cross-linked polymer" refers to a polymer in which the polymer molecules are linked to each other at points in their structures other than at the ends of the polymer chains.

The term "halogen-free" or "non-halogenated" polymer refers to a polymer that does not have any halogen atoms attached to it. In one embodiment, the halogen-free polymer is a chlorine-free polymer. The term "halogen-free" does not exclude halogen that may be present at contaminate levels, for example, levels of up to about 5% by weight, and in one embodiment up to about 2% by weight, and in one embodiment up to about 1% by weight, and in one embodiment up to about 0.5% by weight, and in one embodiment up to about 0.2% by weight, and in one embodiment up to about 0.1% by weight.

It is recognized that when a monomer is polymerized, the resultant monomeric unit within the polymer will have a structure that is slightly altered from the starting monomer. The monomeric unit is equivalent to, i.e., derived or derivable from, the starting monomer, having the same atoms in the same relative positions to each other as in the monomer, only the carbon to carbon double bond of the monomer is converted to a carbon to carbon single bond in the monomeric unit and the excess electrons from that conversion of the monomer are used to bond each monomeric unit to adjacent carbon atoms on an adjacent repeating unit of the polymer. It is to be appreciated that reference herein to a polymer comprising a monomer means that the polymer is comprised of monomeric units equivalent to, i.e., derived or derivable from, the monomer.

In a simplest aspect of the invention, there is provided a novel flame retardant monomer composition. The novel flame retardant monomer composition can comprise a) an ethylenically unsaturated monomer, such as, for example, a group derived from one of a (meth)acrylic acid, (meth)acrylamide, or vinylbenzene, b) a polyphosphate moiety, and c) an amine species. As used herein, vinylbenzene can be styrene or an alkyl substituted vinylbenzene, such as, for example, α-methyl styrene, 1-methyl-2-vinylbenzene, 1-methyl-3-vinylbenzene, 1-methyl-4-vinylbenzene and the like.

As the ethylenically unsaturated monomer, there is also contemplated, for example, 2-hydroxyethyl (meth)acrylate (HEMA). Alternatively, other monomers such as hydroxypropyl (meth)acrylate or 4-hydroxybutyl (meth)acrylate are contemplated. Likewise, 2-hydroxyethyl (meth)acrylamide, hydroxypropyl (meth)acrylamide, polyethyleneglycol (meth)acrylate and the like are contemplated.

In the novel flame retardant monomer composition, one of the ethylenically unsaturated monomers of a) is covalently bonded directly or through a linking group to the polyphosphate moiety of b), forming a precursor monomer unit. Further, the amine species of c) is in complex, typically a salt, with the covalently bonded polyphosphate moiety of b) in the precursor monomer unit. Thus, although the ethylenically unsaturated monomers of a), the polyphosphate moiety of b) and the amine species of c) are disclosed separately, in the novel flame retardant monomer composition the amine species are present in complex with the polyphosphate moiety, and the polyphosphate moiety is covalently bonded to the ethylenically unsaturated monomers of a).

A flame retardant monomer is one that imparts flame retardancy to a polymer in which it is incorporated.

Example embodiments of the novel flame retardant monomer composition can be, for example, phosphate esters of 2-hydroxyethyl methacrylate complexed with guanyl urea and phosphonic esters of 2-hydroxylethyl methacrylate complexed with guanyl urea. Without wishing to be bound by theory, the novel flame retardant monomer composition may be represented, for example, by the novel flame retardant monomer composition of formula I.

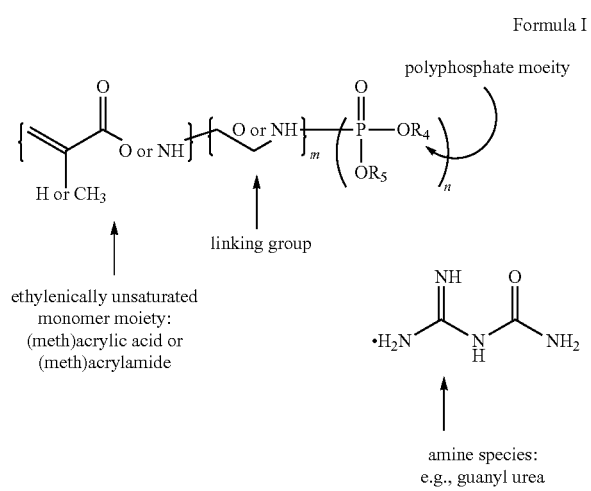

Formula I

In some embodiments of the invention, the term "derived" can mean derived or derivable. In some embodiments, the phosphorus containing monomer can be derived or derivable from (meth)acrylic acid or (meth)acrylamide. By derivable, it is meant that derivation of the monomer is possible from (meth)acrylic acid or (meth)acrylamide, but may also be derived from other materials, such as other (meth)acrylic acid sources, for example, (meth)acrylonitrile in a Ritter reaction. In another example, the (meth)acrylic acid derived flame retardant monomer can be made using a (meth)acrylic acid ester. In such cases as the foregoing examples, the monomer product contains the (meth)acrylic acid or (meth)acrylamide moiety just the same as if it were derived from (meth)acrylic acid or (meth)acrylamide.

As noted above, a precursor monomer unit can be formed from a polyphosphate moiety and an ethylenically unsaturated monomer of a). The polyphosphate moiety can be a polyphosphate or monophosphonate compound of formula $-R_3X-[P(=O)(OR_5)O]_nR_4$, or $-R_3-P(=O)(OR_4)(OR_5)$, where:

X is O or NH,
$R_3$ is a $C_0-C_{50}$ hydrocarbyl linking group having oxygen and/or nitrogen atoms substituted for up to 20 of the carbon atoms,
n can be between about 1 to about 10, or about 1 to about 8, or about 1 to about 6, and preferably from about 1 to about 3,
$R_4$ is H, $M^+$, or alkyl,
$R_5$ is H, or $M^+$, and
$M^+$ is a counterion selected from elements in Groups I and II of the periodic table, or ammonium.

As used herein, ammonium means $NH_4$, or mono-, di-, tri-, or tetra-alkyl ammonium.

In some embodiments, the polyphosphate moiety can contain a tribasic acid of phosphorus. In some embodiments, the polyphosphate moiety can be derived from carboxyethyl monophosphate, carboxyethyl monophosphonate, carboamidoethyl monophosphate, carboamidoethyl monophosphonate, phenethyl monophosphate, or phenethyl monophosphonate.

Often, the precursor monomer unit, i.e., the unit comprised of the (meth)acrylic acid, (meth)acrylamide, or vinylbenzene covalently bonded to a polyphosphate moiety, may be purchased commercially, but non-commercial precursor monomer units are also contemplated herein. Often commercial precursor monomer units are mixtures, such as, for example, Sipomer™ Pam-4000 available from Rhodia, which is a major part HEMA monophosphate ester and a minor part bis(2-hydroxyethyl (meth)acrylate) phosphate ester. Such mixtures are contemplated herein, as well as precursor monomer units that are pure compositions. HEMA polyphosphate can also be made directly from HEMA and phosphorus pentoxide or phosphoric acid. Some other examples of precursor monomer units can include, polyethylene glycol (meth)acrylate phosphate ester (available as PAM-100 from Rhodia), polypropylene glycol (meth)acrylate phosphate ester (available as PAM-200 from Rhodia), methacrylamidoethyl phosphonic acid, vinylbenzene phosphonic acid, vinyl phosphonic acid, and isopropenyl phosphonic acid.

In general, the amine species c) can have a molecular weight of from about 17 to about 3000 g/mole. Suitable amine species for the novel flame retardant monomer composition can be derived from, for example, dicyandiamide, alkylamines, such as, for example, trimethylamine, tri ethyl amine, triethanolamine, and dimethylamine, or guanidine. Other examples of suitable amine compounds are urea, substituted akyl ureas, thiourea, akyl thiourea, cyanamide, ethylenediurea, aniline, ethyleneamines, guanidine, guanamine, benzoguanamine, acetoguanamine, glycoluril, acrylamide, methacrylamide, melamine, benzene sulfonamide, naphthalene sulfonamide, toluene sulfonamide, ammeline, ammelide, guanazole, phenylguanazole, carbamoylguanazole, dihydroxyethyleneurea, ethyleneurea, propylene urea, melem ($C_6H_6N_{10}$), melam ($C_6H_9N_{11}$), octadecylamide, glycine, and their mixtures. A specific example of a suitable amine species for use in the novel flame retardant monomer composition can be guanyl urea, which can be derived from dicyandiamide and water.

Another aspect of the invention is a flame retardant polymer. In one embodiment, the flame retardant polymers may be homopolymers or copolymers comprising the novel flame retardant monomer compositions of the simplest aspect of the invention. In another embodiment, the flame retardant polymers may be a copolymer of A) at least one ethylenically unsaturated monomer unit that is not covalently bonded to a polyphosphate moiety, and B) the novel flame retardant monomer compositions of the simplest aspect of the invention. As a copolymer, the polymer can contain one or more of the same or different ethylenically unsaturated monomer units of A) and/or one or more of the same or different novel flame retardant monomer compositions of B).

In some embodiments, the ethylenically unsaturated monomer units of A) can be from 0% or 0.1% of the monomers in the polymer to about 80% of the monomers in the polymer. Likewise, up to about 65% of the monomers in the flame retardant polymer may be ethylenically unsaturated monomer units of A). Alternately, up to about 70% or 75% of the monomers may be the ethylenically unsaturated monomer units of A).

The ethylenically unsaturated monomer units of A) of the present invention can serve, among other things, to provide particular physical characteristics to the polymer. Thus, one of ordinary skill in the art may choose the appropriate ethylenically unsaturated monomer for the flame retardant polymer based on the particular physical characteristics desired for a particular application of the flame retardant polymer.

Some examples of ethylenically unsaturated monomers not covalently bonded to a polyphosphate moiety suitable for use in the flame retardant polymer can be, for example, one or more of, styrene, $C_1-C_{40}$ alkyl (meth)acrylates, $C_1-C_{40}$ (meth)acrylamides, acrylamide, N-methylolacrylamide, acrylonitrile, acrylic acid, methacrylic acid, itaconic acid, maleic acid, 2-acrylamido-2-methylpropane sulfonic acid, $C_1-C_{40}$ hydroxyalkyl (meth)acrylates, (acetoacetoxy) ethyl methacrylate, $C_1-C_{40}$ hydroxyalkyl (meth)acrylamide, diacetone acrylamide, vinyl esters, butadiene, isoprene and dimeric or multi-derivative compounds thereof. In addition, although the flame retardant polymer can be non-halogenated, halogenated ethylenically unsaturated monomers, such as, for example, vinyl chloride, are also contemplated herein as suitable ethylenically unsaturated monomer units of A) in the flame retardant polymers.

In the flame retardant polymer according to the invention, at least 20% of the monomers in the polymer are selected from the novel flame retardant monomer composition. It is also contemplated that up to 100% of the monomers making up the flame retardant polymer can be the novel flame retardant monomer composition. It is also contemplated that at least 30%, at least 40%, or at least 50% of the monomers in the flame retardant polymer can be the novel flame retardant monomer composition. In certain flame retardant polymers according to the invention, at least 35%), at least 45%, and at least 55% of the monomers may be the novel flame retardant monomer composition.

In some embodiments, at least 80%, or at least 85%, or at least 90%, and in some embodiments at least 95% of the monomers in the polymer comprise a combination of the ethylenically unsaturated monomers that are not covalently bonded to a polyphosphate moiety and the novel flame retardant monomer compositions.

Preferably, the flame retardant polymer is comprised of at least 1 wt. % phosphorus and has a number average molecular weight (Mn) of at least about 1000 g/mole. In other embodiments, the flame retardant polymer may contain phosphorus at from about 1 wt. % to about 15 wt. %, or from about 2 wt. % to about 14 wt. %), or from about 5 wt. % to about 10 wt. %. In one embodiment, the flame retardant polymer contains at least 7 wt. % phosphorus and in another the flame retardant polymer contains about, 9 wt. % phosphorus and in another 10.6 wt. % phosphorus.

The Mn of the flame retardant polymer should be at least 1000 g/mole. The Mn can also be from about 50,000 g/mole to about 1,000,000 g/mole, or from about 100,000 g/mole to about 750,000 g/mole. In one embodiment, the Mn of the flame retardant polymer can be about 200,000 g/mole to about 500,000 g/mole.

Surprisingly, the flame retardant polymers comprised of novel flame retardant monomer compositions provide better flame retardant performance than similar polymers that do not include a polyphosphate/amine species as does the novel flame retardant monomer composition.

Process

In a preferred embodiment, the flame retardant polymer may be produced by first producing a mixture of at least one novel flame retardant monomer composition, and subsequently free-radically polymerizing the mixture to form a flame retardant polymer, for example, as shown in formula II.

Formula II

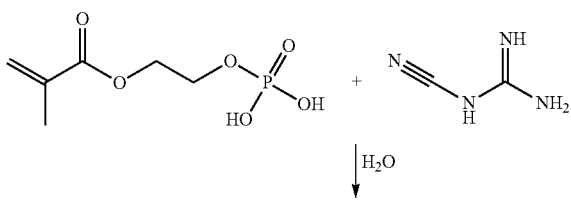

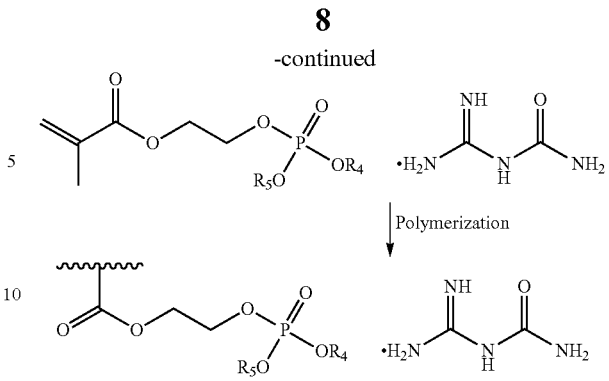

In addition, enough ethylenically unsaturated monomer units of A) can be added to the polymerization mixture of the at least one novel flame retardant monomer composition so that the polymerization results in a flame retardant polymer in which 0% to about 80% (or about 0.1 to 75%, or 1 to 65% or 5 to 55%) of the monomers are ethylenically unsaturated monomer units of A) and at least 20% of the monomers are the at least one novel flame retardant monomer composition. By employing the foregoing process, a flame retardant polymer can be produced wherein up to 80%, or up to 85%, or up to 90% of the monomer units in the polymer can be the novel flame retardant monomer composition. Likewise, up to 95% or up to 100%) of the monomer units in the polymer can be the novel flame retardant monomer composition.

The mixture of the at least one novel flame retardant monomer composition can be produced, in one embodiment, by reacting a mixture of at least one precursor monomer unit with a mixture of at least one amine species for between 10 minutes and 8 hours, preferably about 1 and 5 hours, at a temperature of between about 20° C. and 100° C., preferably 70° C. to 95° C., to form the mixture of the at least one novel flame retardant monomer composition.

In an alternate embodiment, the flame retardant polymer may be produced by first producing a pre-cursor polymer by free-radically polymerizing precursor monomer units along with enough ethylenically unsaturated monomer units of A) to produce a polymer in which 0% to about 80% of the monomers are ethylenically unsaturated monomer units of A) and at least 20% of the monomers are precursor monomer units. Subsequent to polymerization, the precursor polymer may be reacted with enough amine species to complex the polyphosphate moieties in the precursor monomer units, as shown, for example, in formula III.

Formula III

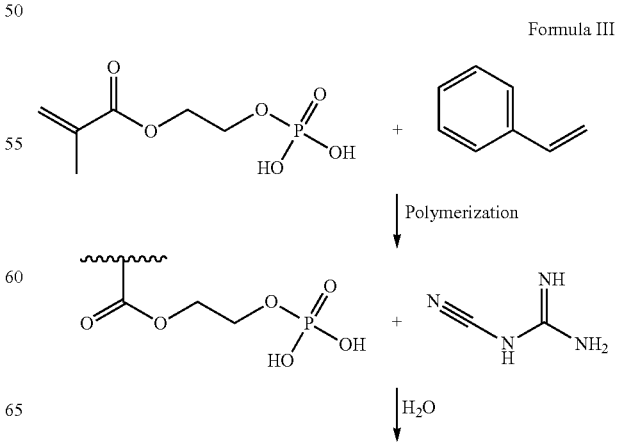

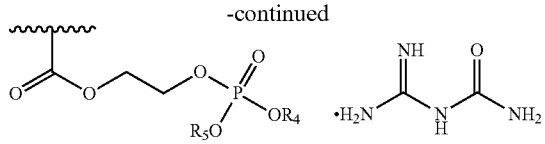 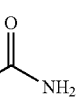

By employing the foregoing process, a flame retardant polymer can be produced wherein up to 30%, or up to 35%, or up to 40% of the monomer units in the polymer can be covalently bonded with polyphosphate moieties.

Notably, a counterion may be introduced into the compound during pH adjustment. For example, NaOH, KOH, ammonium hydroxide or alkyl ammonium hydroxide may be employed for pH adjustment, resulting in substitution of the hydrogen of one or both of the hydroxyls with a counterion, such as $Na^+$, $K^+$, ammonium, or alkyl ammonium.

In some embodiments, a polymerization catalyst or other standard catalyst may be employed to assist polymerization. Examples of polymerization catalysts can be alkali metal hypophosphite salts, such as sodium hypophosphite, alkali metal phosphites, alkali metal polyphosphates, alkali metal dihydrogen phosphates, polyphosphoric acids, and alkyl phosphinic acids. In the case where a novel flame retardant monomer composition is produced and then polymerized, use of a polymerization catalyst can result in up to 95%, or up to 97.5%, or even up to 100%) of the monomer units in the polymer covalently bonded with polyphosphate moieties. Likewise, in the case where polymerization takes place prior to complexing, use of a polymerization catalyst can result in up to 80%, or up to 85%, or up to 88%), or even up to 90% of the monomer units in the polymer covalently bonded with polyphosphate moieties. Solvent can be employed at any point in the processes, including during addition and reaction of the vinyl monomers used in the polymerization.

In either embodiment of the processes to produce the flame retardant polymers, the mixture of the at least one precursor monomer unit can be obtained commercially, or by readily known processes to those of ordinary skill in the art.

In one embodiment the at least one precursor monomer unit can be made directly from the reaction of an alkoxyl (meth)acrylate with phosphorus pentoxide in water.

In the process to produce the flame retardant polymer, the polyphosphate to amine species (P:N) ratio in the amine species reaction step can be from about 1:0.2 to about 1:15. The P:N ratio can also be from about 1:0.5 to about 1:10, or from about 1:1 to about 1:5. Additionally, in either embodiment, the amine species reaction step may be performed in the presence of water. In particular, the reaction step may be completed by reacting the precursor monomer units or precursor polymer with dicyandiamide and water. The reaction with dicyandiamide and water will result in the production of a guanyl urea, which guanyl urea can then complex with the polyphosphate moiety in the precursor monomer units. The complexation reaction may result in other by-products, which by-products are contemplated herein.

In either embodiment, free radical polymerization or copolymerization of the monomers may be by any polymerization process, such as, for example, by dispersion polymerization, solution polymerization, photo-polymerization, or radiation polymerization. Emulsion polymerization may be used. The monomers may be emulsified with an anionic, cationic, or nonionic surfactant or dispersing agent, or compatible mixtures thereof such as a mixture of an anionic and a nonionic surfactant, using, for example, from about 0.05% to about 5% by weight of a surfactant or dispersing agent based on the weight of the monomer. Suitable cationic dispersion agents include lauryl pyridinium chloride, cetyldimethyl amine acetate, and alkyldimethylbenzylammonium chloride, in which the alkyl group has from 8 to 18 carbon atoms. Suitable anionic dispersing agents include, for example, alkali fatty alcohol sulfates, such as sodium lauryl sulfate, and the like; arylalkyl sulfonates, such as potassium isopropylbenzene sulfonate, and the like; alkali alkyl sulfosuccinates, such as sodium octyl sulfosuccinate, and the like; and alkali arylalkylpolyethoxyethanol sulfates or sulfonates, such as sodium t-octylphenoxypolyethoxyethyl sulfate, having 1 to 5 oxyethylene units, and the like. Suitable non-ionic dispersing agents include, for example, alkyl phenoxypolyethoxy ethanols having alkyl groups of from about 7 to 18 carbon atoms and from about 6 to about 60 oxyethylene units such as, for example, heptyl phenoxypolyethoxyethanols; ethylene oxide derivatives of long chained carboxylic acids such as lauric acid, myristic acid, palmitic acid, oleic acid, and the like, or mixtures of acids such as those found in tall oil containing from 6 to 60 oxyethylene units; ethylene oxide condensates of long chained alcohols such as octyl, decyl, lauryl, or cetyl alcohols containing from 6 to 60 oxyethylene units; ethylene oxide condensates of long-chain or branched chain amines such as dodecyl amine, hexadecyl amine, and octadecyl amine, containing from 6 to 60 oxyethylene units; and block copolymers of ethylene oxide sections combined with one or more hydrophobic propylene oxide sections. High molecular weight polymers such as hydroxyethyl cellulose, methyl cellulose, polyacrylic acid, polyvinyl alcohol, and the like, may be used as emulsion stabilizers and protective colloids. Alternatively, the monomers can be polymerized without a surfactant.

The polymerization may be initiated in the presence of a small particle size preformed emulsion polymer (e.g., seed polymerization), or unseeded. Seeded polymerization may yield an aqueous dispersion of latex polymer having more uniform particle size than unseeded polymerization.

Chain transfer agents may be used to control molecular weight and include mercaptans, polymercaptans, alcohols, and halogen compounds used in the polymerization mixture in order to moderate the molecular weight of the polymeric binder. Generally, from 0% to about 3% by weight, based on the weight of the polymeric binder, of $C_4$-$C_{20}$ alkyl mercaptans, mercaptopropionic acid, or esters of mercaptopropionic acid, may be used.

The polymerization process may comprise a batch process, continuous process, staged process, or a process involving any other method. Each stage of a staged process may incorporate thermal or redox initiation of polymerization. A monomer emulsion containing all or some portion of the monomers to be polymerized in a given stage may be prepared using the monomers, water, and emulsifiers. A solution of initiator in water may be separately prepared. The monomer emulsion and initiator solution may be co-fed into the polymerization vessel over the course of the emulsion polymerization of any stage of the process. The reaction vessel itself may also initially contain seed emulsion and further may additionally contain an initial charge of polymerization initiator. The temperature of the contents of the reaction vessel may be controlled by cooling to remove heat generated by the polymerization reaction or by heating the reaction vessel. Several monomer emulsions may be simultaneously co-fed into the reaction vessel. When multiple monomer emulsions are co-fed, they may be of different novel flame retardant monomer composition. The sequence and rates at which the monomer emulsions are co-fed may be altered during the emulsion polymerization process. After addition of the first monomer emulsion(s) has been completed, the polymerization reaction mixture may be held at some temperature for a time and/or treated with a polymerization inhibitor prior to polymerization of the subsequent monomer emulsion(s). Similarly, after addition of the final monomer emulsion(s) has been completed, the polymerization reaction mixture may be held at some temperature for a time and/or treated with a polymerization inhibitor before cooling to ambient temperature.

The pH of the polymers can be adjusted to about 3.0 to about 10.0 in the premix or in the emulsion polymer with commonly used base, such as, for example, ammonium hydroxide, sodium or potassium hydroxide, magnesium hydroxide, tri(m)ethylamine and the like.

Flame Retardant Compositions

The flame retardant polymers may contain conventional ingredients such as solvents, plasticizers, pigments, dyes, fillers, emulsifiers, surfactants, thickeners, rheology modifiers, heat and radiation stabilization additives, defoamers, leveling agents, anti-cratering agents, fillers, sedimentation inhibitors, U.V. absorbers, antioxidants, flame retardants, etc. It may contain other polymeric species such as additional polymers in the forms of blends, interpenetrating networks, etc.

In one embodiment, the flame retardant polymers may be blended with additional flame retardant additives, which are well known in the literature and art. Exemplary flame retardant additives include non-halogen flame retardants, such as melamine and melamine derivatives, such as melamine cyanurate, melamine borate, melamine phosphate, melamine molybdate; borates; organic phosphates, organic phosphinates such as, for example, Exolit™ OP 1230 and 1311 available from Clariant, and phosphorus containing compounds, such as, 9,10-dihydro-9-oxa-10-phosphaphenanthrene-10-oxide, tetrakis(hydroxymethyl) phosphonium chloride and bis[tetrakis(hydroxymethyl) phosphonium]sulfate; inorganic compounds such as aluminum trihydrate, antimony oxide, ammonium phosphate, ammonium polyphosphate, calcium carbonate, clay, and talc. Although, in some embodiments, the flame retardant polymers are desired to be non-halogenated, blending the flame retardant polymers with halogenated flame retardants, such as chlorinated and brominated compounds, such as pentabromodiphenyl ether, octabromodiphenyl ether, decabromodiphenyl ether, and hexabromocyclododecane, is contemplated herein. Often more than one flame retardant is used and frequently 3 or more flame retardants are combined in flame retardant formulations. The level of flame retardants used in conjunction with the flame retardant polymers and copolymers of the present invention can be from about 1 to about 50 parts by weight of flame retardant additive per 100 parts by weight of the flame retardant polymer.

Just as the ethylenically unsaturated monomers can be chosen to impart particular physical properties to the flame retardant polymer, additional polymers can be blended with the flame retardant polymers and copolymers of the present invention to produce blends of further flame retardancy or with certain physical properties. Examples of other polymers that may be blended can include polyurethane polymers, polyamide polymers, polyurea polymers, polyester polymers, polyacrylate polymers, phenolic resins or mixtures thereof.

The polymer may be combined with other commercial polymers or polymer dispersions by methods known to those skilled in the art. The polymer may be used for forming hybrids with other polymers such as urethanes or silicones. This may be done by polymerizing additional monomers by emulsion or suspension polymerization in the presence of the polymer, blending the polymer with other preformed polymers, or synthesizing the polymer in the presence of other polymers.

In one embodiment, the polymer may be mixed with a phenolic resin in a condensation reaction, preferably containing 0.5-10 wt % of N-methylol (meth)acrylamide.

Adjuvants useful in the preparation of the polymer and/or in its subsequent use may be added during or subsequent to the polymerization reaction. These may include auxiliary surfactants; defoamers such as, for example, SURFYNOL™ 104E and Nopco™ NXZ used at a level from about 0.001 to about 0.1 wt. % based on the weight of the monomer mixture; leveling agents such as, for example, Sag™ Silicone Antifoam 47, used at a level from about 0.001 to about 0.1 wt. % based on the weight of the monomer mixture; antioxidants such as, for example, MAROXOL™ 20 and IRGANOX™ 1010 used at a level from about 0.1 to about 5 wt. % based on the weight of the monomer mixture; plasticizers such as, for example, FLEXOL™ plasticizer; and preservatives such as, for example, KATHON™ at a level of about 30 to about 45 parts per million (ppm), or PROXEL™ GXL at a level of about 300 to about 500 ppm.

It is known that some of the materials described above may interact in the final formulation, so that the components of the final formulation may be different from those that are initially added. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

Flame Retardant Applications

In one embodiment, the flame retardant compositions described above can be employed as a coating for fibrous filtration media. Use of the flame retardant compositions have exhibited a particular advantage in fibrous filter media by improving flame retardancy without negatively effecting the air permeability or pressure drop through the fibrous filter. That is, fibrous filter media coated with the novel flame retardant compositions have improved air permeability and exhibit lower pressure drops than prior art flame retardant compositions.

Fibrous filtration media can include a) filtration fabric also known as "paper" or rolled goods; b) synthetic filtration fabrics often referred to as "non-wovens" such as polypropylene, polyethylene, polystyrene, and related polyolefins; fiberglass; glass microfibers; polyamides such as nylon (6 and 6/6), Kevlar, Nomex; polyesters such as Dacron; polyacrylates, polymethacylates, polyacryonitrile such as Orlon, polyvinyl chlorides and related materials, such as Saran; polytetrafluoroethylene; polyurethanes; copolymers of the above materials; and combinations thereof; c) natural filtration fabric such as cellulose and other paper-based filtration media paper; wool; cotton; hemp; fiber glass; glass microfibers, carbon fibers; and combinations thereof; and d) Woven fabric made from fibers such as cotton, nylon 6, polytetrafluorethylene (PTFE), nylon 6.6, nylon 11, nylon 12, halar (E-CTFE), polyester PBT, Polyester PET, polypropylene, acrylics, polyvinyl-den fluoride (PVDF), polyphosphate sulfide (PPS) and high density polyethylene, (e) filter aids such as adsorbents like diatomaceous earth, perlite, activated carbon, carbon black and related materials, anthracite, silicas, aluminas, and combinations thereof. Combinations of filter media can be used.

The types of filters that can be coated with the coating composition include filter pads, filter bags, filter cartridges, pleated filters, membrane filters, strainers, screens, candle filters, plastic filters, ceramic filters, filter presses, belt filters, rotary drum filters, leaf filters, plate filters, disc filters, "precoat filters", a filter bed on a strainer element or support, air filters, and the like.

The coated filters can be useful for the filtration of gases for the removal of solid contaminants which are exemplified by dirt particles, dust, $SiO_2$, $AlO_2O_3$, $Fe_2O_3$, CaO, MgO, $Na_2O$, $K_2O$, $TiO_2$, clays, solid metal particles, carbon materials such as carbon black and activated carbon, particulates in industry, and combinations thereof, removal of odors, removal of toxic materials, and the filtration of other gases such as nitrogen, oxygen, carbon dioxide and the like, or flue gases, residual Hg, $SO_3$ and the like and combinations thereof and the filtration of aerosols, removal of acids (HIC, acetic acid, etc.). The filters may be antibacterial and antiviral.

The coated filter can be useful for the filtration of liquids for the removal of water-insoluble contaminants such as solids contaminants which are exemplified by dirt particles, dust, $SiO_2$, $Al_2O_3$, $Fe_2O_3$, CaO, MgO, $Na_2O$, $K_2O$, $TiO_2$, clays, solid metal particles, carbon materials such as carbon black and activated carbon, particulates in industry, and combinations thereof. The coated filter is useful for the removal of liquid contaminants such as insoluble and non-miscible liquids such as aromatic compounds, hydrocarbons, halocarbons and combinations thereof. The coated filter is also useful for the removal of water-soluble contaminants such as water-soluble metal ions and metal oxides such as Hg, Cu, $H_3AsO_3$, $H_3AsO_4$, Pb, Cd, Ba, Be, Se, and the like; acids such as carboxylic acids, inorganic acids such as sulfuric acid), bases such as metal hydroxides, metal bicarbonates and carbonates; amines; soluble chemical contaminants such as amines, sulfur compounds, phosphorus compounds, unsaturated compounds, phenols, MTBE (methyl t-butyl ether), chlorocarbons (and other halocarbons); aromatic compounds such as phenols, alcohols, and the like; gases such as $CO_2$, $SO_2$, $H_2S$; odorous materials and combinations thereof. Furthermore, the coated filter on a filtration media is useful for the removal of fluid-insoluble particles contaminants such as by dirt ($SiO_2$, etc.); wear debris in engines and machinery; as CaO particulates in the manufacture of detergents; carbon black and activated carbon in manufacturing such as in the pharmaceutical industry; soot and other carbon-based solids in engine oils and combinations thereof.

The flame retardant polymers can be added to fibrous filter media by any conventional means, for example, by impregnation, saturation, foam coating, spraying, dipping or other other coating procedure after preparing a thread, woven cloth, or nonwoven fabric from fibers, or kneading or blending with a synthetic polymer fiber in melting, extruding and spinning processes. A method of introducing a flame retardant by chemical bonding, such as covalent bonding in preparing polymer may also be employed.

The flame retardant compositions described herein exhibit advantages over prior art compositions employed as coatings on fibrous filter media. The coatings can provide flame retardancy at lower pickup levels than some prior art fibrous filter coatings. Fibrous filter coatings of the flame retardant compositions do not significantly affect filtration efficiency, noticeably increase pressure, or decrease flow rate through the filter. Moreover, the compositions are not easily removed by water, as exemplified below where the coating composition maintains flame retardancy even after the filter upon which the composition is coated is repeatedly washed with water.

EXAMPLES

Sample 1—FR Polymer with 35% of Monomers being PAM-4000 in Complex with Guanyl Urea, and in a Composition with Organic Phosphinate FR Additive Exolit™ 1230 (Clariant)

In a semi-batch emulsion polymerization set up, 175 g water, 0.1 g of 30% sodium laurylsulfate (SLS) and 0.06 g Dextrol OC-40 are placed in a reactor. The mixture is heated to 75° C. and a solution of 1 g ammonium persulfate (APS) in 12 g water is added, followed immediately by a premix for 3 hours at 75° C. A premix mixture of 130 g water, 6 g Dextrol OC-40, 0.8 g concentrated ammonium hydroxide, 6 g of 48% N-methylol acrylamide (NMA), 89 g ethyl acrylate (EA), 40 g butyl methacrylate (BMA) and 67 g Sipomer™ PAM-4000 is prepared and added to the reactor. 6 g water is used to flush the line after the addition. 30 minutes later, 1 g APS in 12 g water is added in one portion and is allowed to react for 30 minutes before cooling to 62° C. At 62° C., 0.36 g of 17.5% t-butyl hydroperoxide (t-BHP) and 0.14 g Bruggolite™ FF6 (sulfinic acid derivative from Bruggemann Chemical) in 10 g water is added and the reaction is stirred for 45 minutes. A mixture of 1.2 g water, 0.68 g of 17.5% t-BHP and 0.14 g of 30% SLS is added followed by a solution of 0.2 g sodium formaldehyde sulfoxylate in 7 g water. The reaction, which is essentially clean from coagulation, is allowed to cool to below 30° C., and is then filtered through double layer cheese cloth.

200 g of the filtered material is placed in a 500 ml reactor with 26 g dicyandiamide and 26 g water. The mixture is stirred and reacted under nitrogen atmosphere for about 2 hours before cooling down to room temperature. The product is filtered then blended with 54 g Exolit™ 1230 and 50 g water using a high speed stirrer equipped with Cowle blade for 30 minutes at 1200 rpm to produce the final polymer composition.

Sample 2—FR Polymer with 65% of Monomers Being PAM-4000 in Complex with Guanyl Urea, and in a Composition with FR Additive Melamine Cyanurate 63.7 g Sipomer™ PAM-4000, 25.5 g dicyandiamide, 0.1 g butylated hydroxytoluene (BHT) and 89.2 g water are mixed under air and heated to 90° C. for 2 hours before cooling down.

The product is mixed with 3 g of 48% NMA, 34.3 g EA and 1 g OC-40. In a reactor, 220 g water, 20 g dicyandiamide, 0.5 g of 30% SLS and 0.03 g OC-40 are mixed and stirred under nitrogen, then heated to 75° C. 0.55 g SPS in 6 g water is added in one portion, followed by the aforementioned premix in 3 hours. 3 g water is used to flush the line. 30 minutes after the addition, 0.1 g APS in 3 g water is added and the reaction proceeds for 30 more minutes at 75° C. before cooling to 62° C. The reaction mixture is then subject to a redox reaction twice, the same way as in the previous example. After cooling to less than 30° C., the product is filtered, and then blended with 45 g melamine cyanurate.

Sample 3—FR Polymer with 70% of Monomers Being PAM-4000 in Complex with Guanyl Urea 300 g Sipomer™ PAM-4000, 120 g dicyandiamide, 0.3 g BHT and 420 g water are reacted at 90° C. for 2 hours. The product is mixed with 12 g of 48% NMA and 128.6 g EA to be pumped in 3 hours into a reactor containing 775 g water and 60 g dicyandiamide initiated with 2.4 g APS in 25 g water at 75° C., as described in previous examples. 12 g water is used to flush the line. Additional 0.45 g APS in 12 g water is added 30 minutes later. The mixture is stirred for 30 minutes before cooling to 62° C. The mixture is redoxed twice with 0.31 g APS in 12 g water and 0.31 g FF-6 in 20 g water before cooling down. The product is filtered through a double layered cheese cloth with no apparent coagulum.

Sample 4—FR Polymer with 97.5% of Monomers being PAM-4000 in Complex with Guanyl Urea 292.5 g Sipomer™ PAM-4000 is mixed with 409.5 g water, 117 g dicyandiamide and 0.24 g BHT, and brought to 90° C. under air. The reaction is heated at about 90 to about 92° C. for 5.5 hours and then cooled down. The pH of the resultant solution is measured at 4.52.

A reactor containing 470 g water and 15 g sodium hypophosphite is heated to 75° C. under a nitrogen atmosphere and 1.4 g APS in 18 g water is added. Thereafter the previously prepared solution is metered over three hours into the reactor with 15 g of 48% N-methylol acrylamide. The reaction temperature is brought up to 78° C. 10 g of water is used to rinse the line. 30 minutes after the metering, 0.27 g APS in 9 g water is added and the reaction is continued for 30 more minutes at 78° C. The reaction mixture is cooled to 62° C. and a redox system containing 0.2 g APS in 6 g water and 0.2 g FF-6 in 15 g water is added in sequence. 30 minutes later the same redox system is added and the reaction is allowed to cool to room temperature. The translucent material has a pH of 4.67.

Sample 5—FR Polymer Made Directly from HEMA 51 g HEMA and 0.03 g butyl hydroquinone are placed in a 250 ml 3-neck flask. The mixture is heated to 50° C. under air while 27.9 g phosphorus pentoxide is added in 5 portions over 30 minutes. The reaction is then heated to 80° C., held for 2 hours, and cooled to about 60° C. 12 g of water is added followed by 32.9 g dicyandiamide in portions to keep the reaction temperature below 70° C. The temperature is then brought to 90° C. and held for 3 hours before cooling to 60° C. and adding 60 g demineralized water. The mixture is stirred until the temperature is below 30° C. The pH of the aq. solution is 3.8 and phosphorus NMR reveals that 44% of the phosphorus is monophosphate, 40% is diphosphate and about 16% is triphosphate.

To the solution is added 34.65 g styrene, 29.25 g butyl acrylate, 7.5 g 52% N-methylol acrylamide and 2.25 g OC-40. Polymerization performed as described above to obtain a stable latex with essentially no coagulum.

Sample 6—FR Polymer Made Directly from HEMA 371 g HEMA and 0.02 g butyl hydroquinone are placed in a 250 ml 3-neck flask and heated to 60° C. under air while 20.3 g phosphorus pentoxide is added in 5 portions in 30 minutes. The reaction is heated to 60° C. under air and held for about 2 hours. 23 g styrene, 14.5 g butyl acrylate, 24 g dicyandiamide and 8 g water are added. The temperature is slowly brought to 90° C. and held for 3 hours before cooling to 60° C. and adding 40 g demineralized water. The mixture is stirred until the temperature is below 30° C. The pH of the aq. solution is 4.0 and phosphorus NMR shows that 35.8% of the phosphorus is monophosphate, 47.5% is diphosphate and about 16.7% is triphosphate.

To the solution is added 1 g butyl acrylate, 3 g 48% N-methylol acrylamide and 1.5 g OC-40. Polymerization is carried out as described before to obtain a stable latex with essentially no coagulum.

Sample 6(a)—FR Polymer Made Directly from HEMA 511 g HEMA and 0.04 g butyl hydroquinone are placed in a 250 ml 3-neck flask and heated to 50° C. under air while 20.3 g phosphorus pentoxide is added in 5 portions in 30 minutes. The reaction is heated to 60° C. under air and held for about 2 hours. 30 g butyl acrylate, 0.02 g BHT, 33 g dicyandiamide and 12 g DM water are added. The temperature is slowly brought to 90° C. and held for 3 hours before cooling to 60° C. and adding 60 g demineralized water. The mixture is stirred until the temperature is below 30° C. The pH of the aq. solution is 3.8 and phosphorus NMR shows that about 40% of the phosphorus is monophosphate, 48% is diphosphate and about 12% is triphosphate. The solution is adjusted to pH 4.4 with 4.12 g of triethanolamine.

To the solution is added 35 g styrene, 4 g 48% N-methylol acrylamide and 1.5 g 30%) sodium laurylsulfate solution. Polymerization is carried out as described before to obtain a stable latex with essentially no coagulum.

Sample 6(b)—FR Polymer Made Directly from HEMA 34 g HEMA and 0.02 g butyl hydroquinone are placed in a 250 ml 3-neck flask and heated to 50° C. under air while 18.6 g phosphorus pentoxide is added in 5 portions in 30 minutes. The reaction is heated to 60° C. under air and held for about 2 hours. 23 g styrene, 0.02 g BHT, 22 g dicyandiamide and 8 g water are added. The temperature is slowly brought to 90° C. and held for 3 hours before cooling to 60° C. and adding 40 g demineralized water. The mixture is stirred until the temperature is below 30° C. The pH of the aq. solution is 3.44 which is adjusted to 4.47 with 7.4 g 20% NaOH solution.

To the solution is added 19 g butyl acrylate, 3 g itaconic acid and 1 g 30% sodium laurylsulfate solution. Polymerization is carried out as described before to obtain a stable latex with essentially no coagulum.

Sample 7—FR Polymer with Phenolic Resin

The polymer of Sample 4 is used as a flame retardant additive with a resole phenolic resin. The blend ratio is 50% phenolic resin/50%) Sample 4, on a dry weight basis.

Sample 8—FR Polymer with Urethane Resin

The polymer of Sample 4 is used as a flame retardant additive in a waterborne polyurethane dispersion. The blend ratio is 50% polyurethane (Sancure® 2715 from Lubrizol Corporation)/50% Sample 4, on a dry weight basis.

Sample 9—FR Polymer with Urea Formaldehyde Resin

The polymer of Sample 4 is used as a flame retardant additive with a urea formaldehyde resin. The blend ratio is 50% urea formaldehyde (From Arclin)/50% Sample 4, on a dry weight basis.

Example 1—Performance Data for Latex Resins

Paper impregnated with the compositions of Samples 1, 2, 3, 5 and 6 are tested for flame retardancy against paper impregnated with several different controls. The first control composition is Hycar™ 26846, which is a commercial latex composition available from Lubrizol. It is tested on its own and with commercial flame retardant additives in a vertical burn test according to TAPPI 461, Apparatus 3.1 to 3.4, both before water soaking and after being soaked in demineralized water for 24 hours and dried.

PAM-4000 is also tested on its own as a cast film dried at ambient temperature and cured at 300° F. for 5 minutes.

Results are shown in Table 1.

TABLE 1

| Polymer | % Binder Content | FLAME RETARDENCY VERTICAL Burn | | | |
|---|---|---|---|---|---|
| | | Before water soaking | | After water soaking* | |
| | | 1st | 2nd | 1st | 2nd |
| PAM-4000 | N/A | CB | CB | n/a | n/a |
| Hycar 26846 | 20.2-20.7 | CB | CB | CB | CB |
| 100 parts Hycar 26846 + 100 parts Pyrosan SYN | 34.7 | SE | SE | CB | CB |
| 100 pars Hycar 26846 + 100 parts NH4sulfomate | 34.7 | SE | CB | CB | CB |
| Hycar parts 26846 + 100 parts Antiblaze LR3 | 33.9 | SE | SE | CB | CB |
| 100 parts Hycar 26846 + 100 parts Antiblaze LR4 | 32.9 | SE | SE | CB | CB |
| 100 parts Hycar 26846 + 100 parts Antiblaze MC | 33.4 | SE | SE | CB | CB |
| 100 parts Hycar 26846 + 100 parts Martinal OL-104 LE | 32.4 | CB | CB | CB | CB |
| 100 parts Hycar 26846 + 100 parts Melapur MP | 32.0 | SE | SE | CB | CB |

"SE" means self-extinguished and "CB" means complete burn.

Pyrosan™ SYN is an organic phosphate compound available from Emerald Performance Materials.
Antiblaze™ LR3, LR4, and MC are ammonium polyphosphates available from Albemarle Corp.
Martinal™ OL-104 LE is an aluminum hydroxide available from Albemarle Corp.
Melapur™ MP is a melamine phosphate available from DSM Melapur.

While none of the additives above passed the vertical burn test after water soaking, one flame retardant additive was found that could pass vertical burn after soaking, Exolite™ OP 1230, a non-halogenated flame retardant available from Clariant. For purposes of comparison, the level of OP 1230 was continually increased until the additized composition passed vertical burn after water soaking.

TAPPI 461 procedures were again followed for the vertical burn test of OP 1230 added to Hycar™ 26855, a commercial latex available from Lubrizol. For the water soaking, a paper sample was soaked in demineralized water for 2 hours, dried and soaked in fresh demineralized water for another 2 hours. The procedure was repeated one more time for a total of 6 hours of soaking before the vertical burn test.

In addition to the vertical burn test, the OP 1230 sample is also tested for air permeability and pressure drop (Average of 3 measurements using TEXTEST FX 3300 Air Permeability Tester III, with Test Head Model FX 3300-38, in accordance with ASTM D 737), and mullen burst (TAPPI T-403, procedure 9.1 and 9.2, average of 4 measurements on Mullen Tester). A mullen burst of 50 to 65 would be desireable along with an aged mullen burst of about 10 to about 25. Results are shown in Table 2.

TABLE 2

| Polymer | % Binder Content | Vertical Burn | | MULLEN BURST (psi) | | Air Permeability cfm @ 125 Pa | Pressure Drop (Pa) |
|---|---|---|---|---|---|---|---|
| | | Before soak | After soak | Unaged | 24 HRS/ 160° C. | | |
| Hycar 26855 | 19.3 | CB | CB | 53.8 to 62.0 | 14.4 to 22.5 | 88.8 | 0.673 |
| 100 parts Hycar 26855/ 65 parts Exolit OP1230 | 28.2 | CB | CB | xx | xx | 73.3 | 0.941 |

TABLE 2-continued

| Polymer | % Binder Content | Vertical Burn | | MULLEN BURST (psi) | | Air Permeability cfm @ 125 Pa | Pressure Drop (Pa) |
|---|---|---|---|---|---|---|---|
| | | Before soak | After soak | Unaged | 24 HRS/ 160° C. | | |
| 100 parts Hycar 26855/ 100 parts Exolit OP1230 | 34.3 | CB | CB | xx | xx | 72.8 | 0.893 |
| 100 parts Hycar 26855/ 150 parts Exolit OP 1230 | 37.2 | SE | CB | 46.7 | 8.5 | xx | Xx |

TABLE 2-continued

| Polymer | % Binder Content | Vertical Burn Before soak | Vertical Burn After soak | MULLEN BURST (psi) Unaged | MULLEN BURST (psi) 24 HRS/ 160° C. | Air Permeability cfm @ 125 Pa | Pressure Drop (Pa) |
| --- | --- | --- | --- | --- | --- | --- | --- |
| 100 parts Hycar 26855/ 200 parts Exolit OP 1230 | 41.2 to 43.8 | SE | SE | 54.9 to 59 | 9.4 to 17.1 | 45.6 to 50.5 | 1.68 to 1.48 |

"Cfm" is cubic feet per minute.
"Psi" is pounds per square inch.
"Pa" is pascal.

At the high level of OP 1230 additive, the air permeability was much lowe than the control and the pressure drop was much higher.

Samples 1 to 6 are tested for vertical burn, mullen burst, air permeability and pressure drop according to the same procedures. Results are shown in Table 3.

TABLE 3

| Polymer | % Binder Content | Vertical Burn Before soak | Vertical Burn After soak | MULLEN BURST (psi) Unaged | MULLEN BURST (psi) 24 HRS/ 160° C. | Air Permeability cfm @ 125 Pa | Pressure Drop (Pa) |
| --- | --- | --- | --- | --- | --- | --- | --- |
| Sample 1 | 39.5 | SE | SE | 60.7 | 15.8 | 68.1 | 0.996 |
| Sample 2 | 29.8 | SE | SE | 44.8 | 32.7 | 84.8 | 0.809 |
| Sample 3 | 28.8 to 29.9 | SE | SE | 56.0 to 60.0 | 14.7 to 19.4 | 81.5 to 89.4 | 0.666 to 0.724 |
| 90 parts Sample 3/ 10 parts Hycar 26855 | 29.5 | SE | SE | 53 | 13.3 | 90.6 | 0.668 |
| Sample 5 | 28.3 | SE | SE | 38 | 6 | 97.8 | 0.584 |
| Sample 6 | 29.5 | SE | SE | 41 | 11 | 88.7 | 0.638 |

Another important factor for filter media is retention of tensile strength. Filter media coated with the materials are also tested for dry and wet tensile properties. Results are shown in Table 4.

Dry Tensile and Elongation:

A 1 inch by 3 inch sample is tested in the machine direction (MD) and cross direction (CD) in an MTS Insight instrument at a crosshead speed of 12 inches per minute. The jaw gap was 2 inches. Reported results are based on average of 4 tests. The Peak Tensile Strength, the maximum tensile developed in a test specimen before rupture, is reported in pounds per inch. Peak Elongation, the maximum tensile strain developed in the test specimen at maximum tensile strength before rupture, is expressed as percentage, i.e., one hundred times the ratio of the increase in length of the test specimen to the original test span.

Wet Tensile and Elongation:

The same test procedure is used as with Dry Tensile/Elongation, except that the samples were soaked in 0.1% Triton X-100 surfactant solution for 1 minute before testing.

TABLE 4

| | % Binder Content | Dry Tensile MD Strength (lbs/in) | Dry Tensile MD Elongation % | Dry Tensile CD Strength (lbs/in) | Dry Tensile CD Elongation % | Wet Tensile MD Strength (lbs/in) | Wet Tensile MD Elongation % | Wet Tensile CD Strength (lbs/in) | Wet Tensile CD Elongation % | Mullen Burst (psi) DRY | Mullen Burst (psi) WET | Mullen Burst (psi) Aged 320° F./24 hrs |
| --- | --- | --- | --- | --- | --- | --- | --- | --- | --- | --- | --- | --- |
| Hycar 26855 | 19.3 to 21.8 | 32.1 to 39.5 | 3.92 to 7.16 | 21.7 to 27.3 | 5.38 to 8.68 | 12.2 to 16.0 | 6.80 to 9.78 | 7.29 to 10.2 | 9.13 to 12.6 | 53.8 to 62.0 | 24.4 to 33.6 | 14.4 to 22.5 |
| Sample 1 | 38.5 | 33.7 | 6.49 | 24 | 8.98 | 13.3 | 11.9 | 8.41 | 15.1 | 56 to 60.7 | 31.9 | 15.8 |
| Sample 2 | 29.8 | 23.1 | 4.41 | 19.3 | 5.28 | 10.2 | 8.37 | 6.27 | 11.2 | 44.8 | 20.8 | 32.7 |
| Sample 3 | 28.8 | 39.7 | 4.97 | 26.8 | 6.23 | 11.6 | 8.42 | 7.19 | 11.2 | 57 | 23.5 | 19.4 |

The non-halogenated samples showed no significant difference in physical properties from the control resin.

Example 2—Performance Data for Phenolic Resins

Paper is impregnated with the flame retardant blend of Sample 7 or a resole type control polymer and tested for flame retardancy. The sample and control are tested on their own in a vertical burn test according to TAPPI 461, Apparatus 3.1 to 3.4, both before water soaking and after being soaked in demineralized water. Water soaking occurs by soaking the paper sample in demineralized for 2 hours, followed by drying. This process is repeated a total of 3 times for a total of 6 hours soaking before vertical burn testing.

Results are shown in the table 5 below.

TABLE 5

| Polymer | % Binder Content | Vertical Burn Before Soaking | Vertical Burn After Soaking |
| --- | --- | --- | --- |
| resole control | 20.4 | CB | CB |
| Sample 7 | 33.7 | SE | SE |

In addition to the vertical burn test, the phenolic samples are tested for air permeability and pressure drop (Average of 3 measurements using TEXTEST FX 3300 Air Permeability Tester III, with Test Head Model FX 3300-38, in accordance with ASTM D 737), and mullen burst (TAPPI T-403, procedure 9.1 and 9.2, average of 4 measurements on Mullen Tester). Results are shown in table 6 below.

TABLE 6

| Polymer | % Binder Content | Air Perm cfm @ 125 Pa | Pressure Drop (Pa) | Mullen Burst (psi) Dry | Wet | 160° C./24 hrs Aged |
|---|---|---|---|---|---|---|
| resole control | 20.4 | 121 | 0.437 | 31 | 37 | 26 |
| Sample 7 | 33.7 | 106 | 0.500 | 41 | 48 | 20 |

Filter media coated with the phenolic materials are also tested for dry and wet tensile properties. Results are shown in Table 7.

TABLE 7

| | | TENSILE | | | | | | |
|---|---|---|---|---|---|---|---|---|
| | | DRY | | | | WET | | |
| | % | MD | | CD | | MD | | CD | |
| Polymer | Binder Content | Strength (lbs) | Elongation % | Strength (lbs) | Elongation % | Strength (lbs) | Elongation % | Strength (lbs) | Elongation % |
| Phenolic | 20.4 | 32.0 | 2.42 | 22.6 | 3.21 | 21.8 | 5.04 | 15.3 | 7.04 |
| Sample 7 | 33.7 | 39.2 | 1.73 | 25.5 | 2.09 | 26.6 | 6.60 | 14.7 | 8.17 |

Example 3—Performance Data for Polyurethane Resins

Paper impregnated with the composition of Sample 8 is tested for flame retardancy against paper impregnated with Sancure™ 2715, an aliphatic waterborne polyurethane type polymer. The sample and control are tested on their own in a vertical burn test according to TAPPI 461, Apparatus 3.1 to 3.4, both before water soaking and after being soaked in demineralized water. Water soaking occurs by soaking the paper sample in demineralized for 2 hours, followed by drying. This process is repeated a total of 3 times for a total of 6 hours soaking before vertical burn testing.

Results are shown in the table 8 below.

TABLE 8

| | % | Vertical Burn | |
|---|---|---|---|
| Polymer | Binder Content | Before soak | After soak |
| Sancure 2715 | 26.6 | CB | CB |
| Sample 8 | 34.5 | SE | SE |

In addition to the vertical burn test, the polyurethane samples are tested for air permeability and pressure drop (Average of 3 measurements using TEXTEST FX 3300 Air Permeability Tester III, with Test Head Model FX 3300-38, in accordance with ASTM D 737), and mullen burst (TAPPI T-403, procedure 9.1 and 9.2, average of 4 measurements on Mullen Tester). Results are shown in table 9 below.

TABLE 9

| Polymer | % Binder Content | MULLEN BURST (psi) Unaged | 24 HRS/160° C. | Air Porosity cfm @ 125 Pa | Pressure Drop (Pa) |
|---|---|---|---|---|---|
| Sancure 2715 | 26.6 | 76 | 28 | 86.1 | 0.613 |
| Sample 8 | 34.5 | 61 | 23 | 83.5 | 0.704 |

Example 4—Performance Data for Urea Formaldehyde Resins

Paper impregnated with the composition of Sample 9 is tested for flame retardancy against paper impregnated with a urea formaldehyde resin from Arclin™. The sample and control are tested on their own in a vertical burn test according to TAPPI 461, Apparatus 3.1 to 3.4, both before water soaking and after being soaked in demineralized water. Water soaking occurs by soaking the paper sample in demineralized for 2 hours, followed by drying. This process is repeated a total of 3 times for a total of 6 hours soaking before vertical burn testing.

Results are shown in the table 10 below.

TABLE 10

| | % | Vertical Burn | |
|---|---|---|---|
| Polymer | Binder Content | Before soak | After soak |
| Arclin Urea Formaldehyde | 28.4 | CB | CB |
| Sample 9 | 37.6 | SE | SE |

In addition to the vertical burn test, the urea formaldehyde samples are tested for air permeability and pressure drop (Average of 3 measurements using TEXTEST FX 3300 Air Permeability Tester III, with Test Head Model FX 3300-38, in accordance with ASTM D 737), and mullen burst (TAPPI T-403, procedure 9.1 and 9.2, average of 4 measurements on Mullen Tester). Results are shown in table 11 below.

TABLE 11

| Polymer | % Binder Content | MULLEN BURST (psi) Unaged | 24 HRS/160° C. | Air Porosity cfm @ 125 Pa | Pressure Drop (Pa) |
|---|---|---|---|---|---|
| Arclin Urea Formaldehyde | 28.4 | 9 | 5 | 103.0 | 0.567 |
| Sample 9 | 37.6 | 18 | 4 | 97.8 | 0.584 |

Each of the documents referred to above is incorporated herein by reference. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

What is claimed is:

1. A coated filter media comprising: a fibrous filter media coated with a coating composition comprising a flame retardant polymer, wherein said flame retardant polymer is comprised of monomeric units derived from a flame retardant monomer composition comprised of:
    a) a group derived from one of a (meth)acrylic acid, (meth)acrylamide, or vinylbenzene,
    b) a polyphosphate moiety, and
    c) guanyl urea;
    wherein a) is covalently bonded directly or through a linking group to b) forming a precursor monomer unit, and
    wherein c) is in complex with the covalently bonded polyphosphate moiety of b) in the precursor monomer unit.

2. The coated filter media of claim 1 wherein the polyphosphate moiety is derived from a polyphosphate or monophosphonate compound of formula —$R_3$X—[P(=O)(OR$_5$)O$^-$]$_n$R$_4$, or —$R_3$—P(=O)(OR$_4$)(OR$_5$), where:
    n is about 1 to about 10,
    X is O or NH,
    $R_3$ is a $C_0$-$C_{50}$ hydrocarbyl linking group having oxygen and/or nitrogen atoms substitute for up to 20 of the carbon atoms,
    $R_4$ is H, or M$^+$,
    $R_5$ is H, or M$^+$, and
    M$^+$ is a counterion selected from elements in Groups I and II of the periodic table or ammonium.

3. The coated filter media according to claim 1 wherein the polyphosphate moiety is carboxyethyl polyphosphate, carboxyethyl monophosphonate, carboamidoethyl polyphosphate, carboamidoethyl polyphosphonate, phenethyl polyphosphate, or phenethyl monophosphonate, or mixtures thereof.

4. The coated filter media according to claim 1, wherein the precursor monomer unit is selected from 2-hydroxyethyl (meth)acrylate polyphosphate ester, bis(2-hydroxyethyl (meth)acrylate polyphosphate ester, polyethylene glycol (meth)acrylate polyphosphate ester, polypropylene glycol (meth)acrylate polyphosphate ester, methacrylamidoethyl phosphonic acid, and vinylbenzene phosphonic acid.

5. The coated filter media according to claim 1 wherein the amine species has a molecular weight of from about 16 to 3000 g/mole.

6. The coated filter media according to claim 1 wherein the flame retardant monomer composition is 2-(phosphonooxy)ethyl methacrylate complexed with guanyl urea or (2-(methacryloyloxy)ethyl)phosphonic acid complexed with guanyl urea.

7. The coated filter media according to claim 1 wherein the polymer is a homopolymer.

8. The coated filter media according to claim 1 wherein the polymer is a copolymer of the flame retardant monomer compositions.

9. The coated filter media according to claim 1, additionally comprising ethylenically unsaturated monomers that are not covalently bonded to a polyphosphate moiety.

10. The coated filter media according to claim 1 wherein the phosphorus content is from about 1.0 to about 15.0 wt. % of the polymer.

11. The coated filter media according to claim 1, and further comprising from about 1 to about 50 parts by weight of a flame retardant additive per 100 parts by weight of said flame retardant polymer.

12. The coated filter media of claim 11, wherein the flame retardant additive is one or more of a melamine derivative flame retardant, an organic flame retardant, an inorganic flame retardant, an organic phosphate, phosphonate or phosphinate flame retardant, a halogenated compound flame retardant, and mixtures thereof.

13. The coated filter media of claim 12, wherein the flame retardant additive is melamine cyanurate.

14. The coating composition for filter media according to claim 11 additionally blended with one or more polyurethane polymers, polyamide polymers, polyurea polymers, polyacrylate polymers or mixtures thereof.

15. A method of imparting flame retardancy to a fibrous filter media comprising applying to the fibrous filter media a flame retardant polymer, wherein said flame retardant polymer is comprised of monomeric units derived from a flame retardant monomer composition comprised of:
    a) a group derived from one of a (meth)acrylic acid, (meth)acrylamide, or vinylbenzene,
    b) a polyphosphate moiety, and
    c) guanyl urea;
    wherein a) is covalently bonded directly or through a linking group to b) forming a precursor monomer unit, and
    wherein c) is in complex with the covalently bonded polyphosphate moiety of b) in the precursor monomer unit.

* * * * *